(12) United States Patent
Boyle, III

(10) Patent No.: US 8,684,403 B2
(45) Date of Patent: Apr. 1, 2014

(54) ACTIVE AIRBAG VENTING SYSTEM

(75) Inventor: Walter J. Boyle, III, Lake Orion, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/323,274

(22) Filed: Dec. 12, 2011

(65) Prior Publication Data

US 2013/0147169 A1    Jun. 13, 2013

(51) Int. Cl.
*B60R 21/239* (2006.01)

(52) U.S. Cl.
USPC ..................................... 280/739; 280/743.2

(58) Field of Classification Search
USPC ............................... 280/739, 743.2
See application file for complete search history.

(56) References Cited

U.S. PATENT DOCUMENTS

| | | | |
|---|---|---|---|
| 6,290,257 B1 * | 9/2001 | Bunce et al. .................. | 280/739 |
| 6,648,371 B2 * | 11/2003 | Vendely et al. ............... | 280/739 |
| 6,773,030 B2 * | 8/2004 | Fischer .......................... | 280/739 |
| 6,916,997 B2 * | 7/2005 | Thakur et al. .................. | 177/136 |
| 7,328,915 B2 | 2/2008 | Smith et al. | |
| 7,385,520 B2 * | 6/2008 | Patterson et al. ............. | 340/667 |
| 7,445,237 B2 | 11/2008 | Boyle et al. | |
| 7,600,782 B2 * | 10/2009 | Ishiguro et al. ............... | 280/739 |
| 7,762,584 B2 * | 7/2010 | Morita et al. .................. | 280/739 |
| 7,938,444 B2 * | 5/2011 | Williams et al. ........... | 280/743.2 |
| 8,020,890 B2 * | 9/2011 | Webber .......................... | 280/739 |
| 8,262,130 B2 * | 9/2012 | Fischer et al. ............. | 280/743.2 |
| 2006/0192370 A1 * | 8/2006 | Abe et al. ....................... | 280/735 |
| 2008/0315567 A1 | 12/2008 | Fischer et al. | |
| 2009/0033081 A1 | 2/2009 | Fischer et al. | |
| 2010/0001495 A1 | 1/2010 | Sekino | |
| 2011/0254256 A1 | 10/2011 | Mendez et al. | |

FOREIGN PATENT DOCUMENTS

| EP | 2159112 A1 | 3/2010 |
|---|---|---|
| WO | 2008118526 A1 | 10/2009 |

OTHER PUBLICATIONS

International Search Report dated Mar. 5, 2013 for International Application No. PCT/US2012/068139, International Filing Date Dec. 6, 2012.
Written Opinion dated Mar. 5, 2013 for International Application No. PCT/US2012/068139, International Filing Date Dec. 6, 2012.

* cited by examiner

*Primary Examiner* — Nicole Verley
(74) *Attorney, Agent, or Firm* — Ralph E. Smith

(57) ABSTRACT

An airbag assembly including an airbag inflatable from a housing in operation with an occupant classification system is provided in accordance with an exemplary embodiment of this disclosure. The occupant classification system is incorporated into a vehicle seat and is in communication with the airbag. A selectively actuatable vent formed in the airbag is opened during deployment of the airbag based on a determination from the occupant classification system.

10 Claims, 2 Drawing Sheets

ACTIVE AIRBAG VENTING SYSTEM

FIELD

The present invention relates to an airbag for a passenger vehicle.

BACKGROUND

Many current passenger vehicles are equipped with airbags that deploy in certain vehicle impact events. Airbag deployment usually involves rapid inflation of the airbag with a gas. The inflation rate and force may be controlled in commercial passenger vehicle applications to meet various government regulations. As these regulations become more strict, however, the cost to produce airbag systems tends to increase due to the complexity of sensor systems that may be required to control inflation of the airbag, or disable inflation of the airbag.

SUMMARY

An airbag assembly is provided in accordance with an exemplary embodiment of this disclosure. The airbag assembly includes a housing, an inflatable airbag, a tether, and a selectively actuatable vent. The inflatable airbag is disposed within the housing. The selectively actuatable vent is formed on the airbag. The selectively actuatable vent is opened by the tether when the airbag deploys and the tether remains fixed to the housing. The selectively actuatable vent remains closed when the airbag deploys and the tether is detached from the housing.

An airbag assembly including an airbag inflatable from a housing in operation with an occupant classification system is provided in accordance with an exemplary embodiment of this disclosure. The occupant classification system is incorporated into a vehicle seat and is in communication with the airbag. A selectively actuatable vent formed in the airbag is opened during deployment of the airbag based on a command received from the occupant classification system.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
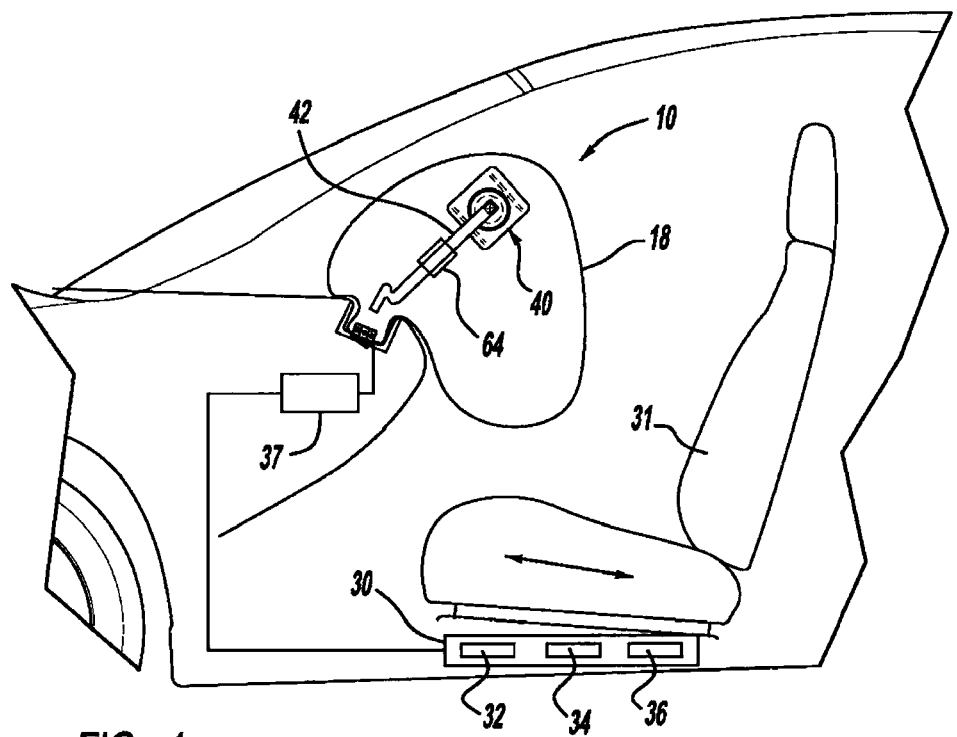
FIG. 1 is a view of an airbag, in a vehicle, including a selectively actuated vent in a closed position according to a principle of the present disclosure.
Figure 2:
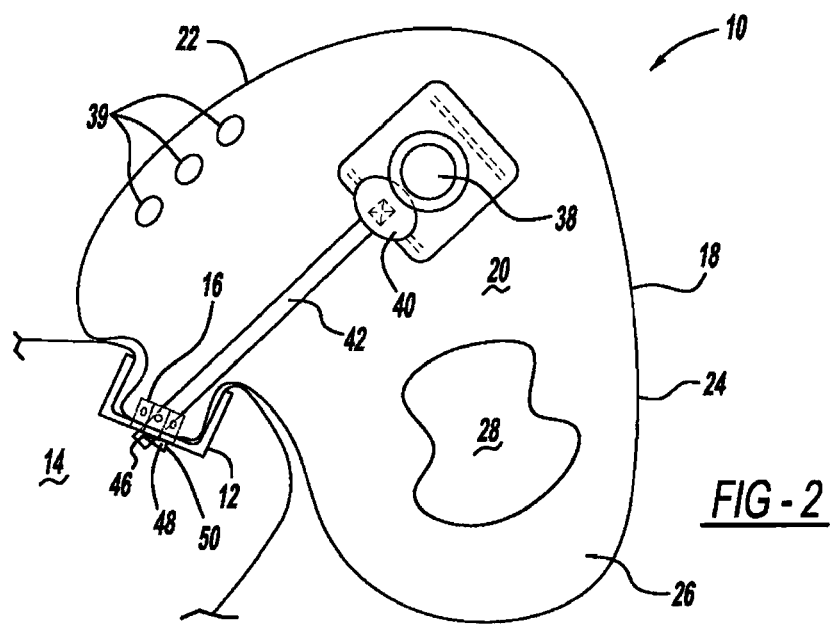
FIG. 2 is a view of an airbag including a selectively actuated vent in an open position according to a principle of the present disclosure.
Figure 3:
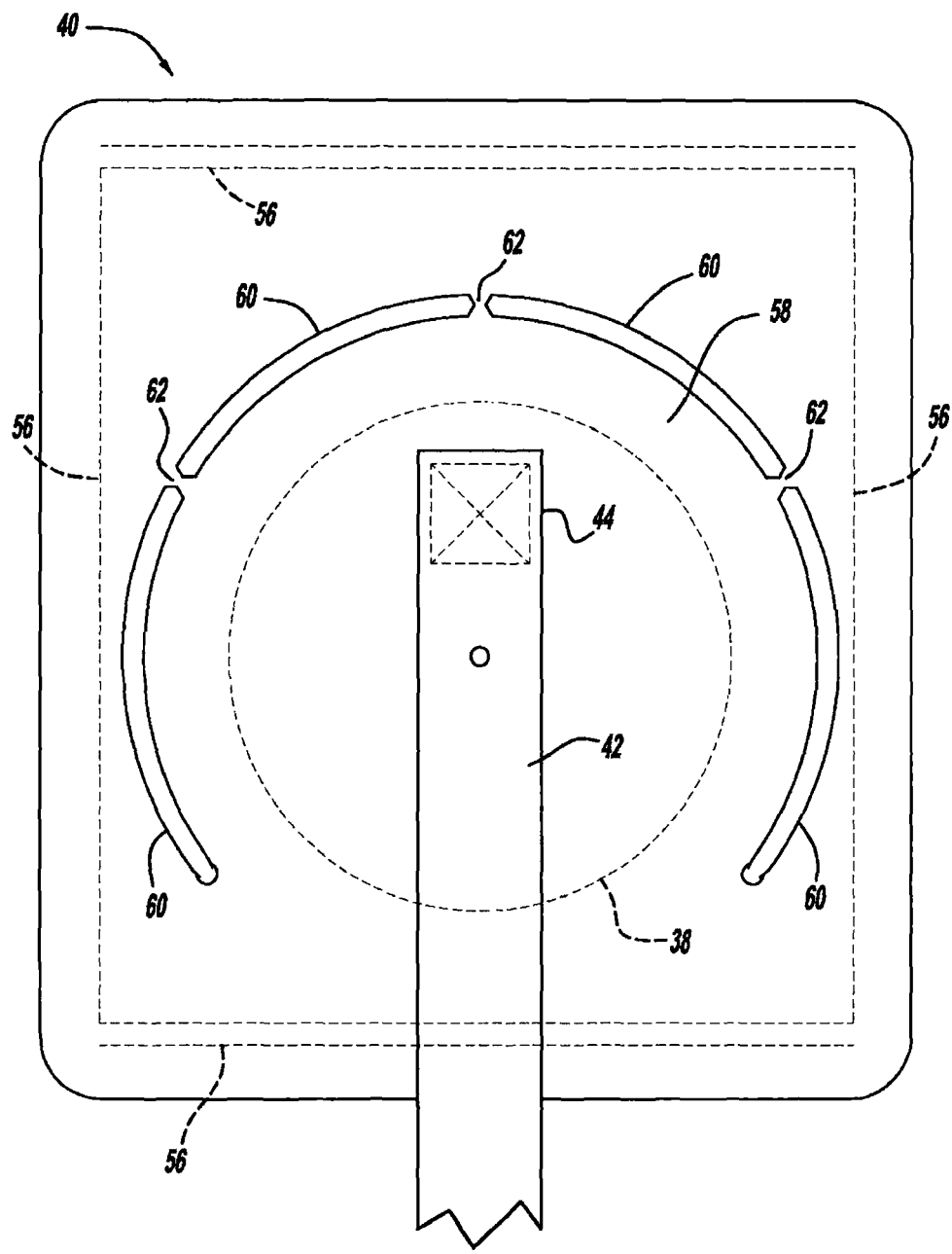
FIG. 3 is a view of a selectively actuatable vent in a closed position according to a principle of the present disclosure.

FIGS. 1-3 illustrate an air bag 10 according to the present disclosure. Airbag 10 may be used, for example, in a passenger vehicle. Although airbag 10 will be described below as a passenger-side airbag, the present disclosure should not be limited thereto. In this regard, airbag 10 may be used as a driver-side airbag, or as a side-curtain airbag. Regardless, as airbag 10 is deployed, airbag 10 is filled with a gas and expanded where airbag 10 may then be engaged with a passenger as is known in the art.

Airbag 10 includes a housing 12 that, as illustrated in FIGS. 1 and 2, may be integrated into a dashboard 14 of the vehicle. Alternatively, airbag 10 may be integrated into a steering wheel (not shown), a side-curtain (not shown), a pillar (not shown), or a door (not shown) of the vehicle. Housing 12 includes an inflator device 16 that, in the event of a collision, deploys a gas that rapidly inflates airbag 10 to protect a passenger in an impact event. Inflator device 16 may be any type of inflator device known to one skilled in the art.

Airbag 10 may be formed of conventional materials, in a conventional manner, and a conventional shape as is known in the art. In this regard, airbag 10 includes a front panel 18, a pair of side panels 20, and a rear panel 22 that define a wall 24 having an exterior 26 that may be engaged with a passenger, and an interior 28 that contains gas emitted by inflator device 16 in the event of deployment of airbag 10. Side panels 20 are located on opposing sides of front panel 18, while rear panel 22 is opposite to front panel 18.

Airbag 10 can be in communication with, as shown schematically, an occupant classification system 30. Occupant classification system 30 can be incorporated within a vehicle seat 31 of the motor vehicle, and can be used to detect information including, for example, a position of the seat 31, a weight of the seat's occupant, and whether a seatbelt is in use. Occupant classification system 30 may also detect a tension on the seatbelt to determine whether a child seat is secured in the seat. Based on information detected by occupant classification system 30, airbag 10 can be prevented from deploying (e.g., no occupant located in the seat) or ready to deploy (e.g., an occupant is present in the seat).

To detect a weight of the seat's occupant and a position of the seat 31, occupant classification system 30 can include at least a pressure sensor 32, a seat position sensor 34, and an electronic control unit (ECU) 36. When an occupant sits on the seat, pressure sensor 32 signals the occupant's weight to ECU 36. ECU 36 then sends that information to airbag 10, which also includes an ECU 37. In contemplated exemplary embodiments, the occupant classification system can receive data about the seated occupant in many ways such as position and weight sensors, belt tension sensors, input about the seated occupant (e.g. identity, age, weight) into a vehicle data device prior to operating the vehicle, etc. In addition to allowing or preventing airbag 10 from deploying, occupant classification system 30 can also signal airbag 10 whether a vent 38 is to be opened or closed during deployment of airbag 10.

Venting of airbag 10 is used to control a stiffness of airbag 10 during deployment. Controlling stiffness of airbag 10 during deployment is important due to the wide variation in the size of occupants, the number of seat positions available, and combinations thereof. For example, if the seat's occupant is an average-sized male (e.g., 5 feet 10 inches tall and 160 pounds), a stiffer (i.e., a more fully inflated) airbag 10 may be desired to more fully cushion the occupant's engagement with airbag 10 during deployment. In contrast, if an average-sized female, child, or the like is located adjacent airbag 10, a softer (i.e., a less than fully inflated) airbag 10 may be desired to more fully cushion the occupant's engagement with airbag 10 during deployment. If a stiffer airbag 10 is engaged by a smaller-sized occupant (such as a child), the occupant may experience injury upon engagement with airbag 10. Similarly, if a position of seat is nearer airbag 10 upon deployment, a softer airbag 10 is desired, while if a position of seat is farther from airbag 10 upon deployment, a stiffer airbag 10 is desired.

To control stiffness of airbag 10 during deployment, airbag 10 includes at least one vent 38 that is selectively controlled. In addition to the selectively controlled vent 38, airbag 10 may be provided with one or more unobstructed or active vents 39 that facilitate a controlled vent rate of the gas expanding the airbag 10 during deployment. Selective venting of airbag 10 through vent 38 is desirable to selectively adjust stiffness (i.e., an amount of inflation of airbag 10) depending on occupant size, seat position, and whether or not a child seat is located adjacent airbag 10. For example, if the occupant classification system determines that an occupant falls within a predetermined classification, e.g. within a minimum size and/or within a minimum distance from the bag, the classification system could provide a signal to open the vent during airbag deployment.

To adjust the stiffness of airbag 10 during deployment, vent 38 can selectively be opened upon deployment. That is, if a stiffer airbag 10 is needed during deployment, vent 38 is to remain closed to allow airbag 10 to more fully inflate. If a softer airbag 10 is needed during deployment, vent 38 is opened upon deployment. That is, as airbag 10 inflates with vent 38 opened, an amount of gas used to inflate airbag 10 is allowed to escape, which softens airbag 10.

To selectively control the opening of vent 38 during deployment, vent 38 is covered by a selectively actuatable flap 40. To actuate flap 40, a tether 42 is attached to flap 40. Tether 42 includes a first end 44 fixed to flap 40, and a second end 46 detachably fixed to housing 12. If vent 38 is to be opened during deployment, tether 42 remains fixed to housing 12. When tether 42 remains fixed to housing 12 and airbag 10 begins to inflate, first end 44 of tether 42 will exit housing 12 along with airbag 10. Once tether 42 has reached its full length during deployment and remains fixed to housing 12, tether 42 will pull open flap 40 to expose vent 38 and allow gas to escape therefrom to soften airbag 10. In the exemplary embodiments, the occupant classification system makes a determination about the seated occupant that corresponds to a signal to operate the vent and tether during airbag deployment. The signal to operate the vent and tether based on the determination about the seated occupant may be provided by a controller in communication with the occupant classification system. In another exemplary embodiment, the occupant classification system may be part of a module located in another portion of the vehicle other than a seat. The controller, e.g. an electronic control unit (ECU), may be separated from the module and in communication with another controller, e.g. a controller that directs an operation of a portion of the airbag.

In contrast, if vent 38 is to remain closed during deployment of airbag 10 to allow airbag 10 to fully inflate, tether 42 is detached from housing 12 during deployment. That is, as stated above, second end 46 of tether 42 is detachably fixed to housing 12. To detach tether 42 from housing 12, housing 12 includes a tether detachment device 48 that detaches second end 46 of tether 42 from housing 12.

Tether detachment device 48 may be a guillotine-type detachment device including a blade 50 that is actuated by ECU 37 of airbag 10 during deployment of airbag 10. Alternatively, tether detachment device 48 may be in the form of a pin (not shown) that secures second end 46 of tether 42 to housing 12. When airbag 10 is deployed, pin (not shown) may be actuated by ECU 37 of airbag 10 to disengage from tether 42 to allow tether 42 to detach from housing 12. Regardless, it should be understood that a tether detachment device 48 can be used to detach tether 42 from housing 12 if vent 38 is to remain closed during deployment of airbag 10.

FIG. 3 illustrates vent 38 and flap 40 of airbag 10 in more detail. Vent 38 may be circular in shape and includes a diameter in the range of 50 mm to 110 mm. Vent 38, however, may have any shape desired. In this regard, vent 38 may be square, rectangular, triangular, oval, X-shaped, or the like. Preferably, vent 38 is formed in either side panel 20 of airbag 10, or is formed in rear panel 22. Vent 38 is formed in either side panels 20 or rear panel 22 to prevent gases used to inflate airbag 10 from contacting the seat's occupant in the event of deployment.

As illustrated in FIG. 3, flap 40 may be formed separately from airbag 10. In this regard, flap 40 may be formed from a piece of fabric that overlaps vent 38. To secure flap 40 to airbag 10, flap 40 may be sewn to airbag 10, as indicated by sew lines 56. It should be understood, however, that flap 40 may be attached to airbag 10 in any manner known to one skilled in the art including, for example, by an adhesive.

Tether 42 is attached to flap 40 at a central portion 58 thereof. Tether 42 may be attached to central portion 58 by sewing (illustrated), but may be attached to central portion 58 in any manner desired so long as tether 42 remains fixed to central portion 58. As illustrated in FIG. 3, central portion 58 is connected to a remainder of flap 40 by pre-cuts 60. Although four pre-cuts 60 are illustrated in FIG. 3, any number of pre-cuts 60 may be used to ensure that central portion 58 may at least partially detach from flap 40 to expose vent 38 if vent 38 is to be opened during deployment of airbag 10.

When airbag 10 deploys and vent 38 is to be opened as directed to occupant classification system 30, tether 42 remains fixed to housing 12. As airbag 10 expands, airbag 10 will expand to an extent where vent 38 will be located a distance away from housing 12 that is greater than a length of tether 42. Once airbag 10 has expanded to an extent that is greater than the length of tether 42, fixed tether 42 will pull on central portion 58 with a force sufficient to at least partially detach central portion 58 from flap 40. That is, tether 42 will pull on central portion 58 with a force sufficient to tear portions 62 of flap 40 located between pre-cuts 60 such that central portion 58 may detach from flap 40 to expose vent 38. When vent 38 is exposed, the inflation gas may escape from airbag 10 to allow airbag 10 to soften.

In contrast, when airbag 10 deploys and vent 38 is to remain closed as directed by occupant classification system 30, second end 46 of tether 42 is detached from housing 12 by tether detachment device 48. As tether 42 is detached from housing 12, even when airbag 10 expands to an extent that is greater than the length of tether 42, vent 38 will not be exposed because central portion 58 will remain attached to flap 40. As tether 42 will be detached from housing 12, however, airbag 10 may be provided with a sleeve 64. Tether 42 is passed through sleeve 64 during fabrication of airbag 10. If second end 46 of tether 42 is detached from housing 12 during deployment of airbag 10, sleeve 64 prevents second end 46 of tether 42 from flapping throughout the vehicle.

What is claimed is:
1. An airbag assembly comprising:
  a housing;
  an inflatable airbag disposed within the housing;
  a vent formed in the airbag,
  a flap attached to an exterior of the airbag that covers the vent, the flap being selectively actuatable to open the vent; and
  a tether exterior to the airbag having a first end fixed to the flap and a second end detachably fixed to the housing, wherein the vent is opened by the tether when the airbag deploys and the second end of the tether remains fixed to the housing to allow the first end of the tether to pull the flap away from the vent; and the vent remains closed when the airbag deploys and the second end of the tether is detached from the housing to prevent the first end of the tether from pulling the flap away from the vent; and wherein the tether is detachable from the housing by a tether detachment device including a movable blade positioned adjacent the housing that is operable to cut the tether.

2. The airbag assembly of claim 1, wherein the vent is formed in a side panel of the airbag.

3. The airbag assembly of claim 1, further comprising an occupant classification system in communication with the airbag.

4. The airbag assembly of claim 3, wherein the occupant classification system determines whether the vent is to be opened or closed upon deployment of the airbag.

5. The airbag assembly of claim 4, wherein the occupant classification system determines whether the vent is to be opened or closed based on a weight of a seat occupant.

6. The airbag assembly of claim 4, wherein the occupant classification system determines whether the vent is to be opened or closed based on a position of a seat.

7. The airbag assembly of claim 3, wherein the occupant classification system includes a pressure sensor, a position sensor, and an electronic control unit.

8. An airbag assembly, comprising:
an airbag inflatable from a housing;
an occupant classification system incorporated into a vehicle seat;
a vent formed in the airbag that is opened during deployment of the airbag based on a command received from the occupant classification system;
a flap connected to an exterior of the airbag that covers the vent, the flap being selectively actuatable to open the vent; and
a tether exterior to the airbag having a first end fixed to the flap and a second end detachably fixed to the housing,
wherein the vent is opened by the tether when the airbag deploys by, based on the command received from the occupant classification system, the second end of the tether remaining fixed to the housing to allow the first end of the tether to pull the flap away from the vent;
the vent remains closed when the airbag deploys by, based on the command received from the occupant classification system, the second end of the tether being detached from the housing to prevent the first end of the tether from pulling the flap away from the vent; and
wherein the tether is detachable from the housing by a tether detachment device including a movable blade disposed proximate the housing that is operable to cut the tether.

9. The airbag assembly of claim 8, wherein the vent is opened during deployment if a weight of the seat's occupant is beneath a predetermined threshold.

10. The airbag assembly of claim 8, wherein the vent is opened during deployment if a position of the seat is at a predetermined position.

* * * * *